United States Patent
Ma et al.

(10) Patent No.: US 8,223,124 B2
(45) Date of Patent: Jul. 17, 2012

(54) COMPUTER MOUSE

(75) Inventors: Xian-Wei Ma, Shenzhen (CN); Yu-Hao Tang, Shenzhen (CN)

(73) Assignees: Hong Fu Jin Precision Industry (ShenZhen) Co. Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 552 days.

(21) Appl. No.: 12/503,867

(22) Filed: Jul. 16, 2009

(65) Prior Publication Data

US 2010/0309126 A1    Dec. 9, 2010

(30) Foreign Application Priority Data

Jun. 3, 2009 (CN) .......................... 2009 1 0302874

(51) Int. Cl.
    *G09G 5/08* (2006.01)
(52) U.S. Cl. ........... 345/163; 345/156; 345/157; 463/37
(58) Field of Classification Search .................. 345/156, 345/157, 163, 164, 167, 169; 307/112–144; 74/471 XY; D14/402, 406; 463/37, 38
See application file for complete search history.

(56) References Cited

U.S. PATENT DOCUMENTS

| | | | | | |
|---|---|---|---|---|---|
| 3,581,029 | A | * | 5/1971 | Noiles ........................ | 200/38 DA |
| 3,587,025 | A | * | 6/1971 | Dokos et al. .................. | 337/273 |
| 3,863,798 | A | * | 2/1975 | Kurihara et al. ............... | 215/301 |
| 3,875,359 | A | * | 4/1975 | Backus ......................... | 200/83 S |
| 3,993,263 | A | * | 11/1976 | Lemery et al. ................. | 242/237 |
| 4,587,510 | A | * | 5/1986 | Kim .............................. | 338/128 |
| 4,712,092 | A | * | 12/1987 | Boldridge et al. .............. | 341/34 |
| 4,725,995 | A | * | 2/1988 | Fowler .......................... | 367/149 |
| 5,263,783 | A | * | 11/1993 | Wu ............................... | 400/490 |
| 5,473,344 | A | * | 12/1995 | Bacon et al. ................... | 345/163 |
| 5,512,722 | A | * | 4/1996 | Ozeki et al. .................... | 200/517 |
| 5,633,658 | A | * | 5/1997 | Ma ................................ | 345/161 |
| 5,790,098 | A | * | 8/1998 | Lin ............................... | 345/163 |
| 6,239,786 | B1 | * | 5/2001 | Burry et al. .................... | 345/161 |
| 6,373,468 | B1 | * | 4/2002 | Leman ........................... | 345/163 |
| 6,522,321 | B1 | * | 2/2003 | Chen et al. ..................... | 345/163 |
| 6,604,486 | B1 | * | 8/2003 | Krisko et al. .................. | 116/268 |
| 6,778,166 | B2 | * | 8/2004 | Lin ............................... | 345/161 |
| 7,821,498 | B2 | * | 10/2010 | Kramer et al. ................. | 345/163 |

\* cited by examiner

*Primary Examiner* — Lun-Yi Lao
*Assistant Examiner* — Gene W Lee
(74) *Attorney, Agent, or Firm* — Altis Law Group, Inc.

(57) ABSTRACT

A computer mouse includes a left key assembly, a right key assembly, a signal processing unit, and a casing. The casing includes a top casing and a bottom casing. The bottom casing includes a bottom convex surface, the contour of the bottom convex surface is an ellipse, the bottom casing defines two first openings in the bottom convex surface, and the two key assemblies are positioned in the corresponding first openings. Each of the left key assembly and the right key assembly includes a hollow receiving column, a movable shaft, an elastic member and a pressure sensor. The movable shaft is received in the receiving columns. The movable shaft and the pressure sensor are spaced from each other via the elastic element. The pressure sensor will generate a corresponding pulse when pressed by the movable shaft. The signal processing unit receives the pulse, and sends a controlling signal.

11 Claims, 4 Drawing Sheets

COMPUTER MOUSE

BACKGROUND

1. Technical Field

The present disclosure relates to a computer mouse.

2. Description of the Related Art

Computers typically include a computer mouse for controlling the motion of the cursor on a display. Current computer mice typically include one or more mechanical buttons which can be clicked for selection of object(s) shown on the display. The challenge of utilizing the computer mouse is: repeated clicks of a mechanical button can result in carpal tunnel syndrome.

Therefore, what is desired is a computer mouse that can overcome the above described problem.

BRIEF DESCRIPTION OF THE DRAWINGS

Many aspects of the present computer mouse should be better understood with reference to the accompanying drawings. The components in the drawings are not necessarily drawn to scale, the emphasis instead being placed upon clearly illustrating the principles of the computer mouse. Moreover, in the drawings, like reference numerals designate corresponding parts throughout the several views.

DETAILED DESCRIPTION

Embodiments of the present computer mouse will be now described in detail with reference to the drawings.

Figure 1:
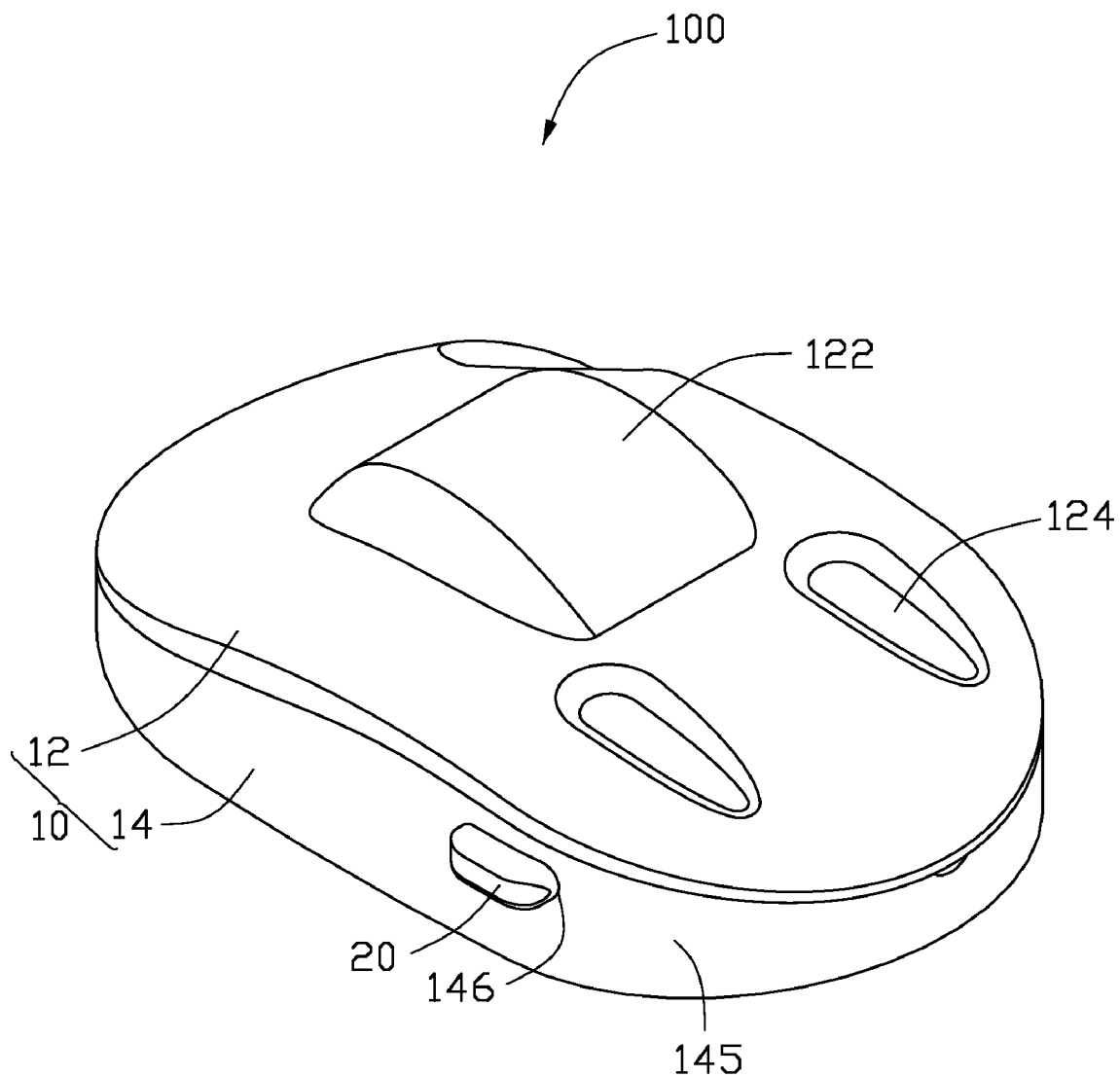
FIG. 1 is an assembled, isometric view of a computer mouse which includes a left key assembly, according to an exemplary embodiment.
Figure 2:
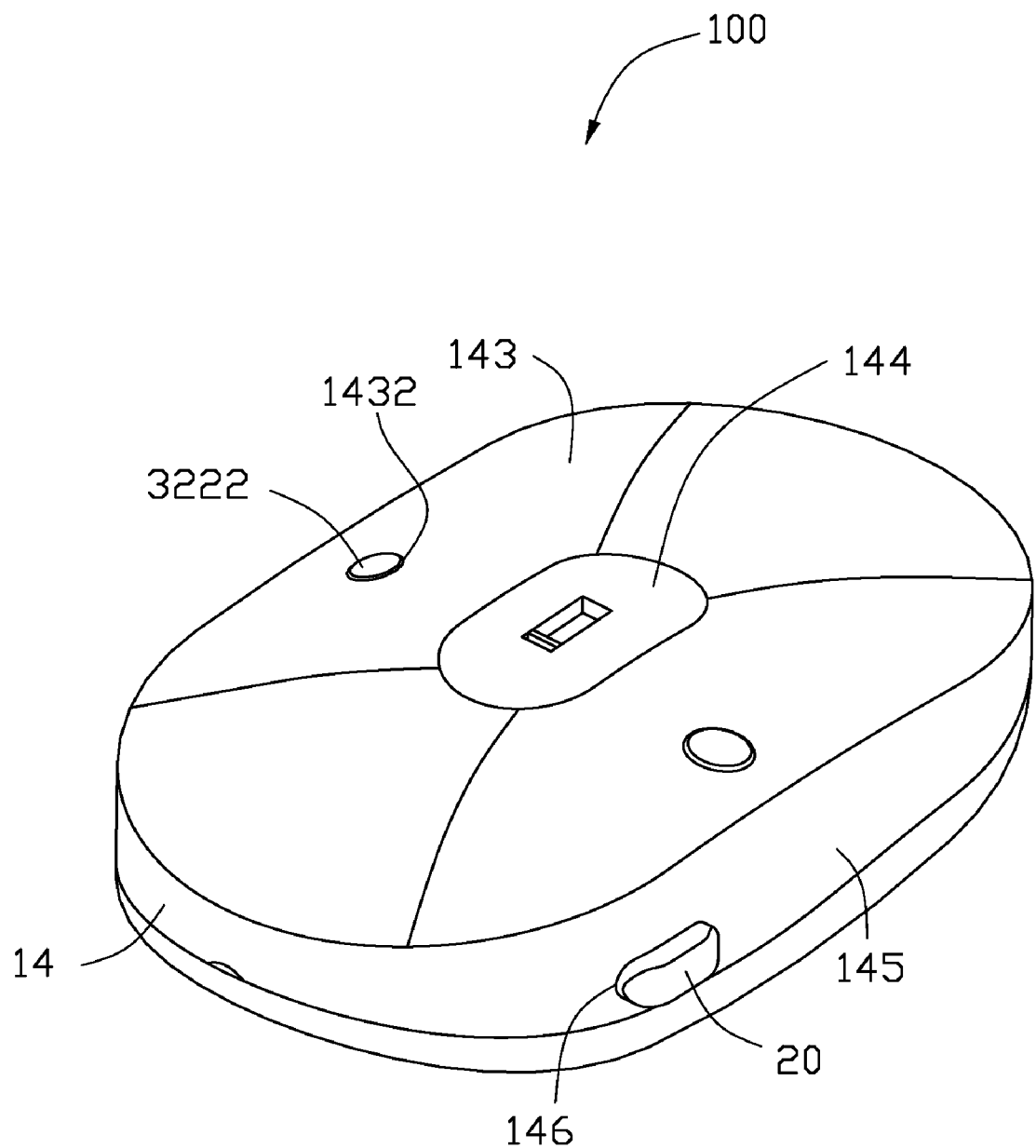
FIG. 2 is an isometric view of the computer mouse of FIG. 1, viewed from the bottom thereof.
Figure 3:
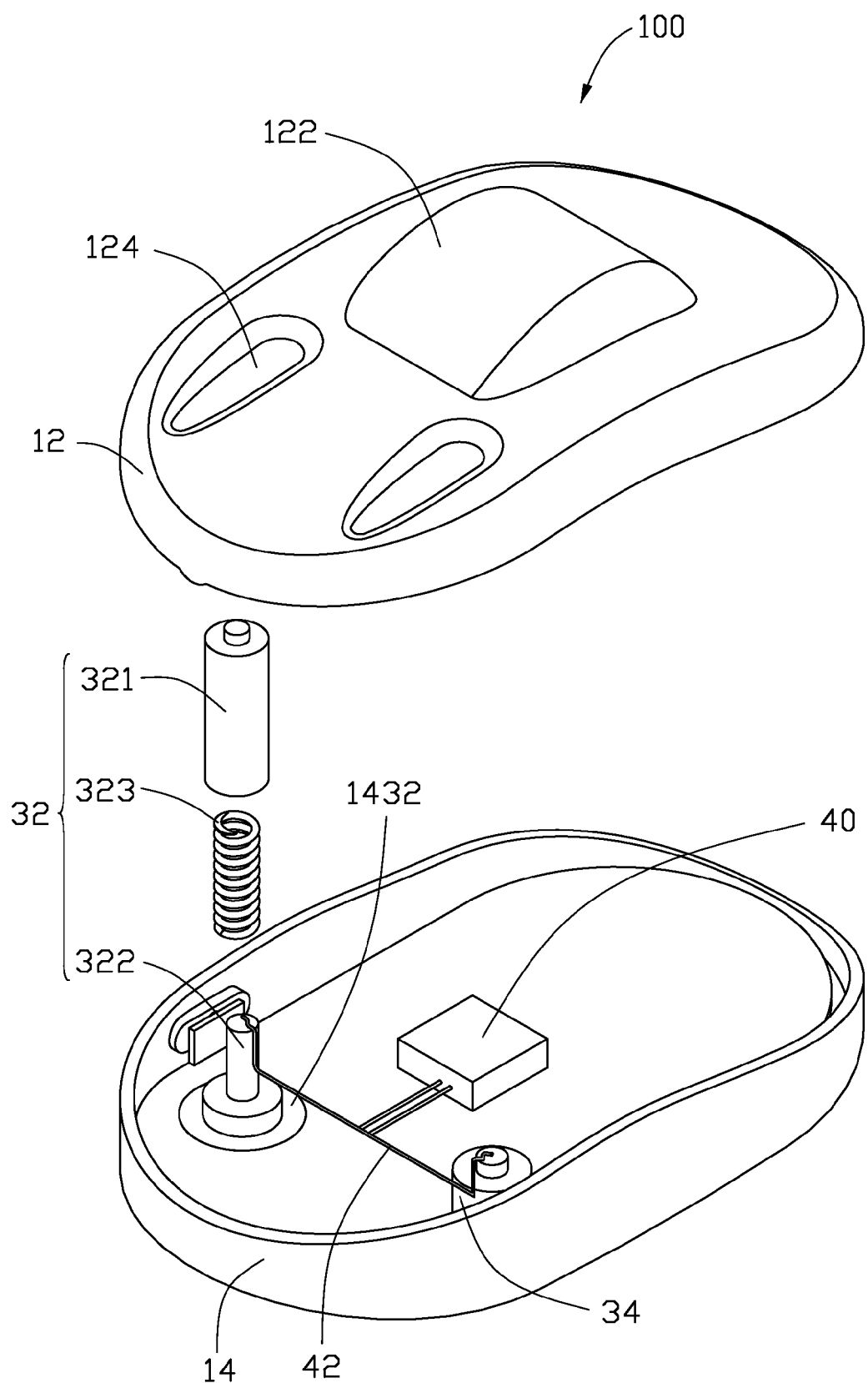
FIG. 3 is an exploded, isometric view of the computer mouse of FIG. 1.

Referring to FIGS. 1-3, a computer mouse 100 in accordance with an exemplary embodiment is illustrated. The computer mouse 100 includes a casing 10, a scroll wheel 20, a left key assembly 32, a right key assembly 34, and a signal processing circuit 40. The casing 10 is configured to support and house the left key assembly 32, the right key assembly 34, and the signal processing circuit 40.

The casing 10 includes a top casing 12 and a bottom casing 14. The top casing 12 and the bottom casing 14 are connected to each other to cooperatively define a chamber for housing the left key assembly 32, the right key assembly 34, the scroll wheel 20, and the signal processing circuit 40.

The top casing 12 includes a holding portion 122 extending substantially perpendicularly upwards from the top casing 12 at an appropriate position, e.g., the middle portion of the top casing 12. The holding portion 122 is shaped so as to more comfortably fit the palm of the hand when using the computer mouse 100. The top casing 12 also defines two receiving depressions 124 for receiving the forefinger and middle finger when the computer mouse 100 is held, e.g. at the front portion of the top casing 12, to more comfortably hold the computer mouse 100.

The bottom casing 14 includes a bottom convex surface 143. The contour of the bottom convex surface 143 is substantially an ellipse. The bottom convex surface 143 defines a central flat portion 144. In this embodiment, the bottom casing 14 defines two first openings 1432 in the bottom convex surface 143. The first openings 1432 are on the minor axis of the ellipse of the bottom convex surface 143 and symmetrical about the central flat portion 144.

The bottom casing 14 also includes a sidewall 145 extending upwards from the bottom convex surface 143. The sidewall 145 defines a second opening 146 in the left portion. The scroll wheel 20 is disposed in the second opening 146. The scroll wheel 20 is electrically coupled to the signal processing circuit 40 to generate a scrolling instruction.

Figure 4:
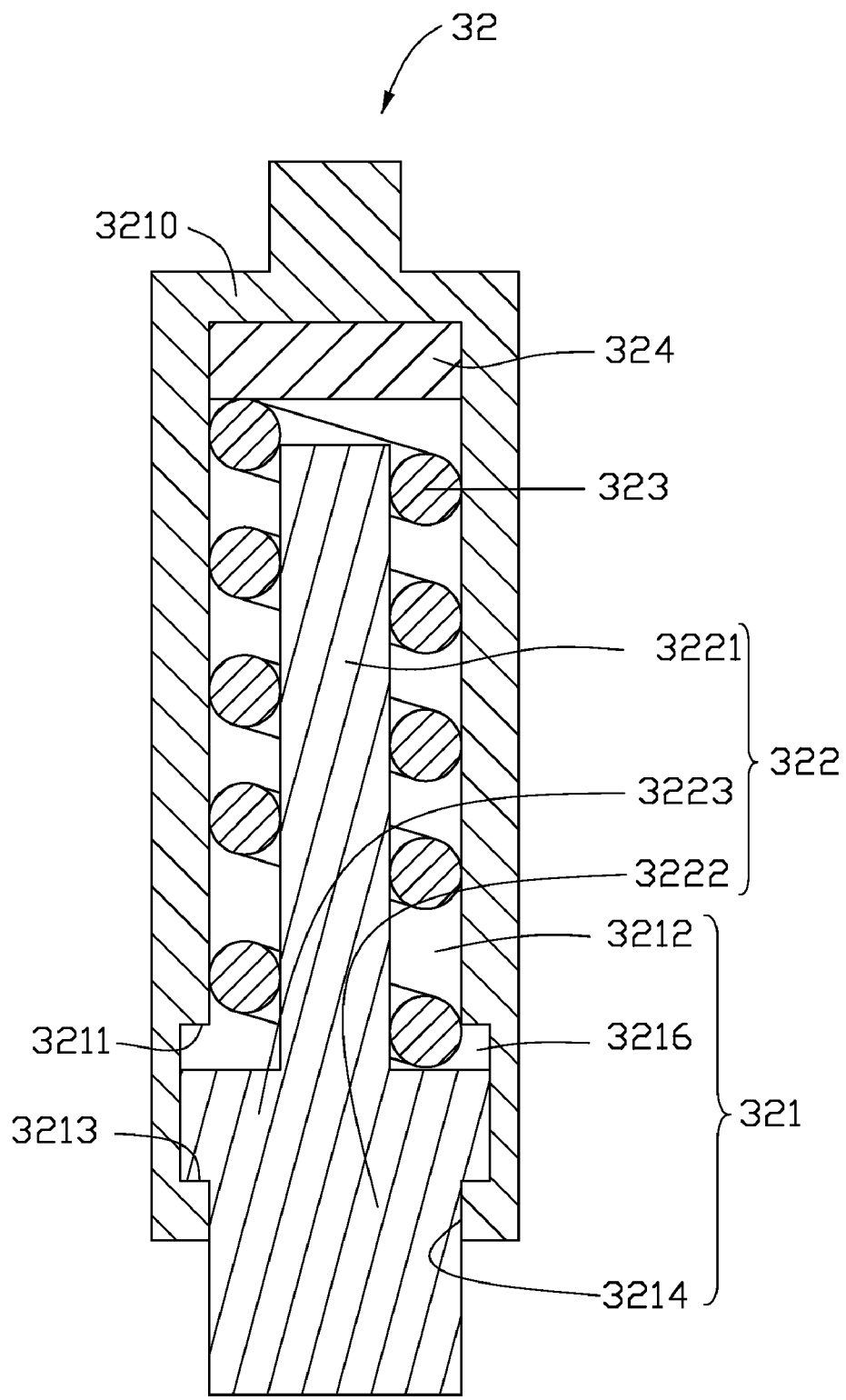
FIG. 4 is a schematic view of the left key assembly of FIG. 1.

Referring to FIG. 4, the left key assembly 32 includes a hollow receiving column 321, a movable shaft 322, an elastic member 323, and a pressure sensor 324.

The hollow receiving column 321 includes a first receiving hole 3212, a second receiving hole 3214, and a third receiving hole 3216 along a central axis of the hollow receiving column 321. The first receiving hole 3212, the second receiving hole 3214, and the third receiving hole 3216 communicate with each other. The first receiving hole 3212 includes a base 3210. The diameter of the first receiving hole 3212 is smaller than that of the third receiving hole 3216, forming a first sidestep surface 3211 between the first receiving hole 3212 and the third receiving hole 3216. The diameter of the third receiving hole 3216 is smaller than that of the second receiving hole 3214, forming a second sidestep surface 3213 between the second receiving hole 3214 and the third receiving hole 3216. The first sidestep surface 3211 faces away from the base 3210. The second sidestep surface 3213 faces the base 3210.

The movable shaft 322 includes a first shaft portion 3221, a second shaft portion 3222, and a third shaft portion 3223 connecting the first shaft portion 3221 and the second shaft portion 3222. Both the diameters of the first shaft portion 3221 and the second shaft portion 3222 are smaller than that of the third shaft portion 3223. The length of the first shaft portion 3221 is slightly smaller than or equal to that of the first receiving hole 3212. The length of the second shaft portion 3222 is slightly larger than that of the second receiving hole 3214. The length of the third shaft portion 3223 is slightly smaller than that of the third receiving hole 3216.

In this embodiment, the elastic member 323 is a coil spring.

In assembly, the pressure sensor 324 is placed into the first receiving hole 3212 and is disposed on the base 3210. The elastic member 323 is coiled around the first shaft portion 3221 of the movable shaft 322. Next, the assembled movable shaft 322 and the elastic member 323 are inserted into the hollow receiving column 321. It should be mentioned that the hollow receiving column 321 is made of elastic material to allow deformation of the hollow receiving column 321, thereby allowing the third shaft portion 3223 to protrude through the second receiving hole 3214 into the third receiving hole 3216. Then, the assembled left key assembly 32 is disposed on the bottom casing 14, where the second shaft portion 3222 passes through the first opening 1432.

The right key assembly 34 has a similar structure with the left key assembly 32 and can be installed to the bottom casing 14 using the similar steps.

The signal processing circuit 40 is electrically connected to the pressure sensor 324 via a number of wires 42. The signal processing circuit 40 is configured to receive the pulses generated by the left key assembly 32, the right key assembly 34, and the scroll wheel 20, and to convert the pulses into control signals to control the cursor movement on a display.

In use, firstly, the computer mouse 100 is supported by the central flat portion 144 and therefore both the third shaft portions 3223 of the left key assembly 32 and the right key assembly 34 abut the corresponding second sidestep surfaces 3213, and the first shaft portions 3221 and the corresponding pressure sensors 324 are spaced from each other. To actuate the left key assembly 32, the left of the bottom casing 14 is tilted, the left portion of the bottom convex surface 143 comes in contact with a support surface under the computer mouse 100. Accordingly, the second shaft portion 3222 of the left key assembly 32 moves towards the base 3210 of the receiving column 321 until the third shaft portion 3223 is limited by the first sidestep surface 3211. At this state, the first shaft portion 3221 presses on the pressure sensor 324. Correspondingly, then the pressure sensor 324 generates a signal pulse. The width of the generated pulse is essentially equal to the duration of the press. Then the signal processing circuit 40 interprets the pulse into a predetermined mouse function such as a click at the position of the cursor on the computer screen based on the pulse width. For example, if the pulse is shorter than a predetermined time, the signal processing circuit 40 interprets the generated pulse into a single click at the position of the cursor. If the pulse is longer than the predetermined time, the signal processing circuit 40 interprets the generated pulse as a click and hold action at the position of the cursor. If during a predetermined period of time, e.g., 1 second, the case is depressed twice on the same side, the signal processing circuit 40 interprets the generated pulses as a double-click at the position of the cursor. In a similar way, to actuate the right key assembly 34, the right of the bottom casing 14 is tilted, the right portion of the bottom convex surface 143 comes in contact with the support surface, the signal processing circuit 40 can also convert the received pulses generated by the pressure sensor 324 of the right key assembly 34 into control signals.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A computer mouse for use in a computer, the computer mouse comprising:
    two key assemblies each comprising a hollow receiving column, a movable shaft, an elastic member, and a pressure sensor, the elastic member coiled around the movable shaft, the pressure sensor placed into the hollow receiving column, the movable shaft received in the receiving column and spaced from the pressure sensor, when the movable shaft presses the pressure sensor, the pressure sensor generating a corresponding pulse, a signal processing circuit configured to receive the pulse generated by the pressure sensor, and to convert the received pulse into control signals; and
    a casing comprising a top casing and a bottom casing connected to the top casing, the bottom casing comprising a bottom convex surface, the bottom casing defining two first openings in the bottom convex surface, the two key assemblies positioned in the corresponding first openings.

2. The computer mouse as claimed in claim 1, wherein the top casing comprises a holding portion extending substantially perpendicularly upwards from the top casing at the middle portion of the top casing.

3. The computer mouse as claimed in claim 1, wherein the top casing defines two receiving depressions for correspondingly receiving the forefinger and middle finger when the computer mouse is held.

4. The computer mouse as claimed in claim 1, wherein the bottom convex surface defines a central flat portion, and the two first openings are symmetrical about the central flat portion.

5. The computer mouse as claimed in claim 1, wherein the movable shaft comprises a first shaft portion, a second shaft portion, and a third shaft portion connecting the first shaft portion and the second shaft portion, both the diameters of the first shaft portion and the second shaft portion are smaller than that of the third shaft portion, and the second shaft portion passes through the first opening.

6. The computer mouse as claimed in claim 5, wherein the hollow receiving column comprises a first receiving hole, a second receiving hole, and a third receiving hole, the first receiving hole, the second receiving hole and the third receiving hole communicate with each other, the diameter of the first receiving hole is smaller than that of the third receiving hole and forming a first sidestep surface, and the diameter of the third receiving hole is smaller than that of the second receiving hole and forming a second sidestep surface.

7. The computer mouse as claimed in claim 6, wherein the length of the first shaft portion is slightly smaller than or equal to that of the first receiving hole, the length of the second shaft portion is slightly larger than that of the second receiving hole, and the length of the third shaft portion is slightly smaller than that of the third receiving hole.

8. The computer mouse as claimed in claim 5, wherein the elastic member is a spring, and the spring is coiled around the first shaft portion of the movable shaft.

9. The computer mouse as claimed in claim 1, further comprises a scroll wheel, the bottom casing also comprises a sidewall extending upwards from the bottom convex surface, the sidewall defines a second opening in the left portion thereof, and the scroll wheel is disposed in the second opening and is electrically coupled to the signal processing circuit to generate a scrolling instruction.

10. The computer mouse as claimed in claim 1, wherein the width of the generated pulse is essentially equal to the duration of the movable shaft pressing on the pressure sensor.

11. The computer mouse as claimed in claim 1, wherein the hollow receiving column is made of an elastic material.

* * * * *